United States Patent Office 3,470,180
Patented Sept. 30, 1969

3,470,180
10b-PHENYL-1,2,3,4-TETRAHYDROPYRIMIDO [2,1-a]ISOINDOL-6-(10bH)-ONES
William J. Houlihan, Mountain Lakes, N.J., assignor to Sandoz Inc., Hanover, N.J.
No Drawing. Original application Dec. 18, 1963, Ser. No. 331,372, now Patent No. 3,334,113, dated Aug. 1, 1967. Divided and this application Jan. 24, 1967, Ser. No. 611,241
Int. Cl. C07d *51/42, 51/46;* A61k *25/00*
U.S. Cl. 260—251                               4 Claims

ABSTRACT OF THE DISCLOSURE

The compounds are of the class of tricyclic compounds having a heteocyclic ring of 6 ring atoms fused to the b-side of a 3-phenylphthalimidine, the heterocyclic ring containing one additional nitrogen atom which is in a 1,3-relationship with respect to the other hetero atom and also ortho to the point of fusion. The compounds are useful as anti-inflammatories and are prepared by reacting an o-benzoylbenzoic acid (or acid halide) with an appropriate ω-substituted alkyleneamine.

---

This application is a division of my copending application Ser. No. 331,372, filed Dec. 18, 1963, now Patent No. 3,334,113.

This invention is directed to compounds which have anti-inflammatory and anticonvulsive activity and thus may be used for either or both activities. The compounds are of particular interest because of their flow toxicity.

Said compounds are of the basic structure

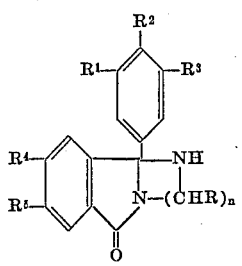

I wherein R is either hydrogen or lower alkyl, e.g., methyl, ethyl, propyl and butyl;
each of $R^1$, $R^2$, $R^3$, $R^4$ and $R^5$ is independently either hydrogen, lower alkyl, e.g. methyl, ethyl, propyl and butyl; lower alkoxy, e.g., methoxy, ethoxy, propoxy and butoxy; amino; chlorine; bromine; fluorine or trifluoromethyl; with the proviso that neither $R^1$ nor $R^3$ is trifluoromethyl when $R_2$ is trifluoromethyl;
and $n$ is Compounds of structure I are prepared (A) by reacting an o-benzoylbenzoyl chloride (a substance that can exist in tautomeric forms, such as VII and VIIa) with an ω-substituted primary amine and subsequently subjecting the product to ring closure according to the reaction scheme:

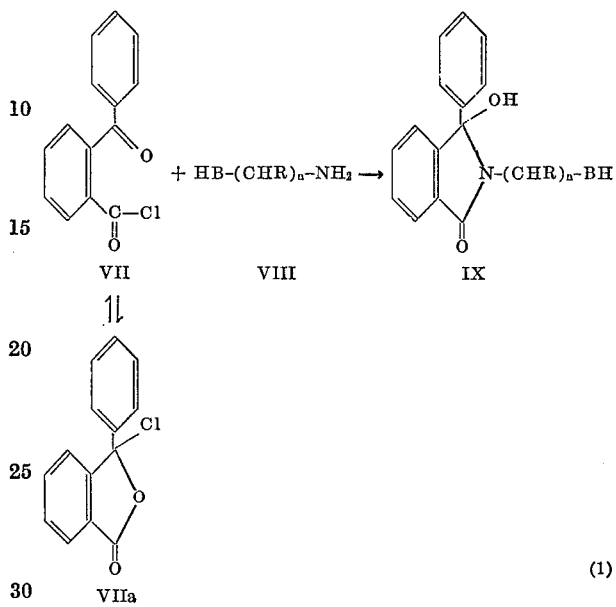

or (B) by reacting an o-benzoylbenzoic acid directly with an ω-substituted primary amine according to the reaction scheme:

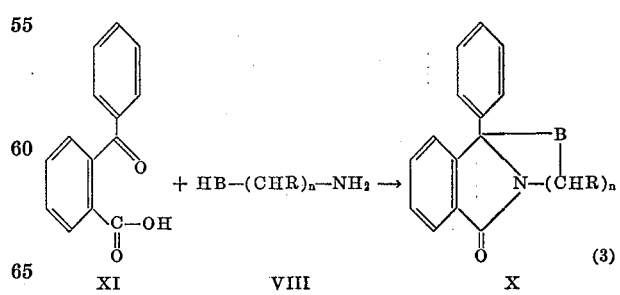

By modification of (B) new intermediates XII are isolatable. This modification proceeds according to the reaction scheme:

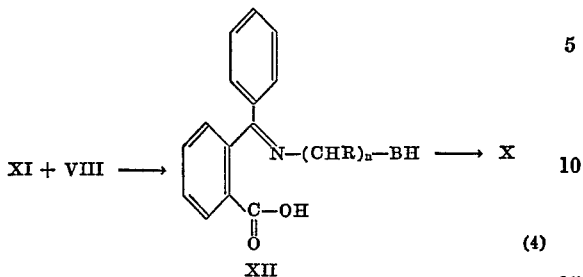

XI + VIII ⟶ [XII] ⟶ X  (4)

In each of the reaction schemes 1, 2, 3, and 4, R and n have the same meanings as previously indicated and B is —NH—. Reaction 1 is carried out in a polar solvent which is inert to the reactants and the reaction product (IX) with or without an acid-binding agent, such as pyridine, alkylpyridine, alkylpyridine and quinoline. Suitable reaction temperatures are from room temperature, e.g., about 20° C., to the boiling point of the solvent employed. It is important to maintain the reaction medium at less than 5 percent by weight (based on the total weight of the amine reactant) of water. The reaction usually takes in excess of 6 hours.

Any polar solvent for the reactants may be used for reaction 1 as long as the solvent is inert to, i.e., does not react with, either the reactants or the reaction product. Example of suitable solvents are: dimethylforamide, diethylformamide, dioxane, chlorbenzene and pyridine.

The product IX or reaction 1 need not be isolated for reaction 2, which is also carried out in a solvent system. The solvent system for reaction 2 contains a catalytic amount of hydrogen ions.

In addition to the solvents contemplated for reaction 1, further solvents such as benzene, alkylbenzenes, chlorbenzene, dichlorobenzene, cycloalkanes, tetralin or other high boiling hydrocarbons, are useful for reaction 2. This reaction is likewise conveniently carried out at a temperature from room temperature to the boiling point of the selected solvent system.

To provide a hydrogen ion source, either an organic or inorganic acid may be used. Para-toluenesulfonic acid is preferred, but other acids, such as alkane sulfonic, e.g., methane sulfonic; arysulfonic, e.g., phenylsulfonic; phosphoric; acid ion exchange resin, e.g. "Dower-50"; acid activated aluminosilicates, e.g., "Tonsil," also produces favorable results.

Reaction 3 is conducted in an inert solvent with or without a catalytic amount of hydrogen ions. The solvents are also the same as those indicated for reaction 2.

The intermediates IX have the same substitution on the aromatic rings as noted for compounds I. Intermediates XII are likewise substituted. The latter are prepared by refluxing XI and VIII with toluene and a hydrogen ion source, such as above-exemplified. Intermediate XII is converted to X by refluxing in xylene with a hydrogen ion source.

As reactant VII, examples of suitable compounds are those of the formulae

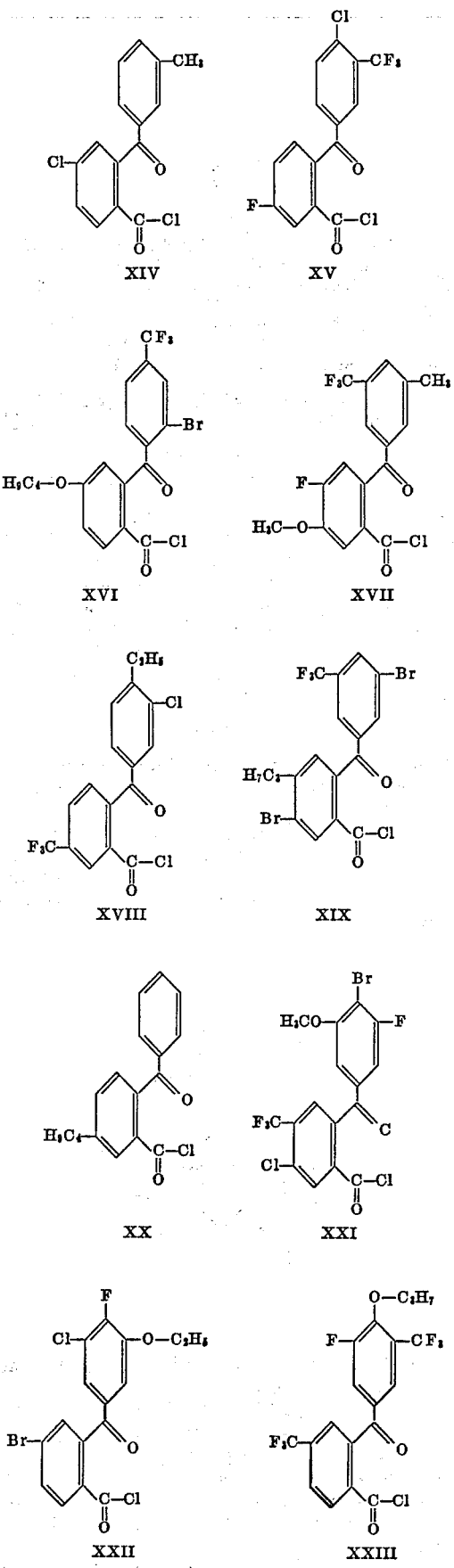

Each of these compounds is prepared according to well known procedures.

Reactant VIII is a saturated acyclic hydrocarbon subsituted with a primary group and a second —NH₂ group. The carbon chain connecting the primary amino group with the other substituent is three carbons in length and may be further substituted with one or more lower alkyl, e.g. methyl, ethyl, propyl and butyl, groups. Any reactant VIII can be reacted (a) with reactant XI in reaction 3 and (b) with any reactant XI in reaction 4.

Reactant XI is the free acid corresponding to reactant VII with respect to possible substitution. Reactant XI can either be made drectly in a manner well known to the art or from the corresponding reactant VII.

The compounds of this invention (compounds of formaulae I to III) are useful in the alleviation of inflammation. For this purpose oral administration is suitable. Intraperitoneal administration affords protection against convulsions and/or death caused by convulsions. Both utilities are evidenced in white male albino mice. For oral administration dosages of 250 milligrams per kilogram of body weight were tolerated and were effective.

The examples which follow are merely illustrative of the invention. Any contemplated combination of substitution may be obtained in the same manner as hereinafter set forth by the corresponding selection of reactants.

In said examples, unless otherwise specified, all parts are parts by weight, all temperatures are in degrees centigrade and the relationship between parts by weight and parts by volume is the same as that between grams and cubic centimeters.

EXAMPLE 1

10b-phenyl-1,2,3,4-tetrahydropyrimido[2,1-a]isoindol-6(10bH)-one

Admix 22.2 g. (0.10 mole) of o-benzoylbenzoic acid with 8.2 g. (0.11 mole) of 1,3-diaminopropane, 150 ml. of toluene and 1.1 g. of p-toluenesulfonic acid in a flask equipped with a stirrer and a Dean-Stark Tube. Stir and reflux until water fails to separate. Remove the solvent in vacuo. Crystallize the residue from methanol.

19.4 g. of 10b - phenyl - 1,2,3,4 - tetrahydropyrimido-[2,1-a]isoindol-6(10bH)-one, M.P. 181° to 183° C., are thus obtained.

EXAMPLE 2

10b-(p-chlorophenyl)-1,2,3,4-tetrahydropyrimido [2,1-a]isoindol-6(10bH)-one

Admix 10.4 g. (0.04 mole) of o-(p-chlorobenzoyl) benzoic acid with 4.44 g. (0.06 mole) of propylene diamine, 150 ml. of toluene and 0.5 g. of p-toluenesulfonic acid in a flask equipped with a Dean-Stark tube. Stir and reflux until water fails to separate from the condensate. Remove the solvent in vacuo. Crystallize the residue from methanol-water.

9.3 g. of 10b - (p - chlorophenyl) - 1,2,3,4 - tetrahydropyrimido[2,1-a]isoindol-6(10bH)-one, M.P. 160° to 162° C. are thus obtained.

EXAMPLE 3

N-(4-aminobutyl)-2-carboxybenzophenone imine

Admix 11.3 g. (0.05 mole) of o-benzoylbenzoic acid with 5.0 g. (0.057 mole) of 1,4-diaminobutane, 150 ml. of toluene and 0.6 g. of p-toluenesulfonic acid in a flask equipped with a Dean-Stark tube and a stirrer. Stir and reflux until condensate fails to liberate water. Remove the solvent in vacuo. Crystallize the residue from methanol-ether. 8.5 g. of N-(3-aminobutyl)-2-carboxybenzophenone imine, M.P. 200° to 201° C., are thus obtained. *Analysis.*—Calculated for $C_{18}H_{20}N_2O_2$: C, 72.9; H, 7.0; N, 9.4; O, 10.7. Found: C, 72.9; H, 7.0; N, 9.2; O, 11.2.

In a similar way all compounds of the formula

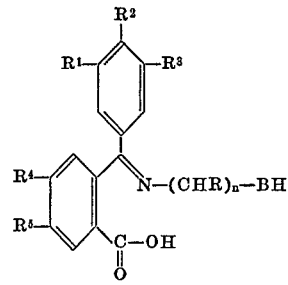

wherein each of R, $R^1$, $R^2$, $R^3$, $R^4$, $R^5$, B and $n$ has the aforedefined meaning, are prepared from corresponding starting materials.

It is thought that the invention will be understood from the foregoing description. Various changes may be made in processes, the intermediates and the final products without parting from the spirit and the scope of the invention or sacrificing its material advantages. The processes, the novel intermediates and the final products hereinbefore described are merely illustrative of preferred embodiments of the invention.

What is claimed is:

1. A compound of the formula

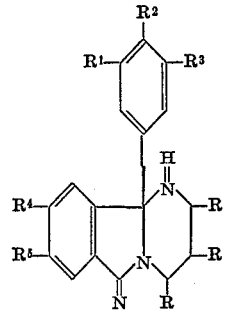

wherein each R is, independently, a member selected from the group consisting of a hydrogen atom and lower alkyl;

each of $R^1$, $R^3$, $R^4$ and $R^5$ is a member selected from the group consisting of a hydrogen atom, lower alkyl, lower alkoxy, amino, a chlorine atom, a bromine atom, a fluorine atom and trifluoromethyl; and $R_2$ is a member selected from the group consisting of a hydrogen atom, lower alkyl, lower alkoxy, amino, a chlorine atom, a bromine atom and a fluorine atom.

2. A compound of the formula

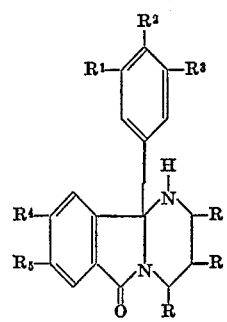

wherein each R is, independently, a member selected from the group consisting of a hydrogen atom and lower alkyl;

each of $R^1$, $R^3$, $R^4$ and $R^5$ is a member selected from the group consisting of a hydrogen atom, lower alkyl, lower alkoxy, amino, a chlorine atom, a bromine atom and a fluorine atom.

3. The compound of claim 1 which is 10b-phenyl-1,2,3,4-tetrahydropyrimido[2,1-a]isoindol-6(10bH)-one.

4. The compound of claim 1 which is 10b-(p-chlorophenyl) - 1,2,3,4 - tetrahydropyrimido[2,1-a]isoindol - 6-(10bH)-one.

References Cited
UNITED STATES PATENTS
3,334,113  8/1967  Houlihan _____ 260—309.7

ALEX MAZEL, Primary Examiner
R. V. RUSH, Assistant Examiner

U.S. Cl. X.R.
424—251; 260—256.4